(12) United States Patent
Isgar (10) Patent No.: US 10,601,999 B1
(45) Date of Patent: *Mar. 24, 2020

(54) COMMUNITY REPORTING SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/287,529

(22) Filed: Feb. 27, 2019

Related U.S. Application Data (63) Continuation of application No. 16/020,831, filed on Jun. 27, 2018, now Pat. No. 10,257,365.

(60) Provisional application No. 62/609,464, filed on Dec. 22, 2017.

(51) Int. Cl.
| | | |
|---|---|---|
| *G06F 15/16* | (2006.01) | |
| *H04M 11/04* | (2006.01) | |
| *H04W 4/18* | (2009.01) | |
| *G06F 16/29* | (2019.01) | |

(52) U.S. Cl.
CPC ............ *H04M 11/04* (2013.01); *G06F 16/29* (2019.01); *H04W 4/185* (2013.01)

(58) Field of Classification Search
USPC .................. 709/204, 201, 202, 203, 231
See application file for complete search history.

(56) References Cited

U.S. PATENT DOCUMENTS

| 8,144,232 B2 | 3/2012 | Larson et al. |
| 2011/0035284 A1 | 2/2011 | Moshfeghi |
| 2013/0110631 A1 | 5/2013 | Mitchell et al. |

*Primary Examiner* — Lan Dai T Truong
(74) *Attorney, Agent, or Firm* — Schmeiser, Olsen & Watts LLP (57) ABSTRACT

A community reporting system is described. The system includes a computer server and a plurality of user computing devices. The system operates to receive from the user computing device a signal having community condition information including a community condition in a corresponding community. The community condition information is geotagged. The system automatically accumulates the community condition information and aggregates the community condition information within the memory of the computer server to store the accumulated and aggregated information corresponding to the community information in which the community condition occurred. The system maintains the community condition information stored in the memory of the computer server. The system also operates to send alerts to user computing devices of the system regarding community conditions corresponding to the stored community condition information within the server.

15 Claims, 5 Drawing Sheets

COMMUNITY REPORTING SYSTEM

CROSS REFERENCE TO RELATED APPLICATION[S]

This application is a continuation of U.S. Patent Application entitled "COMMUNITY REPORTING SYSTEM," Ser. No. 16/020,831, filed Jun. 27, 2018, which claims priority to U.S. Provisional Patent Application entitled "NEIGHBORHOOD REPORTING SYSTEM," Ser. No. 62/609,464, filed Dec. 22, 2017, the disclosures of which are hereby incorporated entirely herein by reference.

BACKGROUND OF THE INVENTION

Technical Field

This invention relates to a community reporting system, particularly a community reporting system using mobile computing devices to submit geotagged reports on community conditions for aggregation and reporting to responsible parties.

State of the Art

Neighborhoods and communities often have problems such as hazards, unsafe conditions, or nuisances. Citizens are typically the first to encounter such problems and lack a responsive or modern system for reporting. Accordingly, there is a need for an application that allows citizens in a neighborhood or community to share information in real time to actively participate in the resolution of such problems.

SUMMARY OF EMBODIMENTS

Disclosed is a community reporting system comprising: a computer server for running an application; and more than one mobile computing device having a global positioning system (GPS) module for geotagging community condition information, wherein geotagged community condition information is uploaded to the computer server to accumulate information and aggregate the information to a specific area. The more than one mobile computing device may be cell phones and/or tablets. The photographs and/or the videos may be geotagged.

An embodiment includes a community reporting system comprising: a computer server having a memory for storing community condition information and community information; and a user computing device coupled to the computer server, the user computing device comprising a global positioning system device for geotagging community condition information, wherein the computer server is programmed to: receive from the user computing device a signal having geotagged community condition information of a community condition in a corresponding community; automatically accumulate the geotagged community condition information and aggregate the community condition information within the memory to store the accumulated and aggregated information corresponding to the community information in which the community condition occurred in response to processing the geotagged community condition information; and maintain the community condition information stored in the memory of the computer server.

Another embodiment includes a community reporting system comprising: a computer server having a memory for storing community condition information and community information; and a plurality of user computing device coupled to the computer server, each user computing device comprising a global positioning system device for geotagging community condition information, wherein the computer server is programmed to: receive from more than one user computing device signals having geotagged community condition information including a community condition in a corresponding community; automatically accumulate the community condition information from the more than one user computing device and aggregate the community condition information within the memory to store the accumulated and aggregated information corresponding to the community information in which the community condition occurred in response to processing the geotagged community condition information; and maintain the community condition information stored in the memory of the computer server.

Another embodiment includes a community reporting system comprising: a computer server having a memory for storing community condition information and community information; and a user computing device coupled to the computer server, the user computing device comprising a global positioning system device for geotagging community condition information, wherein the computer server is programmed to: receive from the user computing device a signal having community condition information including a community condition in a corresponding community; automatically accumulate the community condition information and aggregate the community condition information within the memory to store the accumulated and aggregated information corresponding to the community information in which the community condition occurred in response to processing the geotagged community condition information; and maintain the community condition information stored in the memory of the computer server.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

The application as described herein may be used as a neighborhood or community application to take photographs and data (pictures and/or videos, text messages, etc.) of questionable activity, nuisances, unsafe conditions, or general information about the community. Examples of such include, but are not limited to, fallen road signs, dead trees or shrubbery, graffiti, potholes and other potential nuisances.

Figure 1:
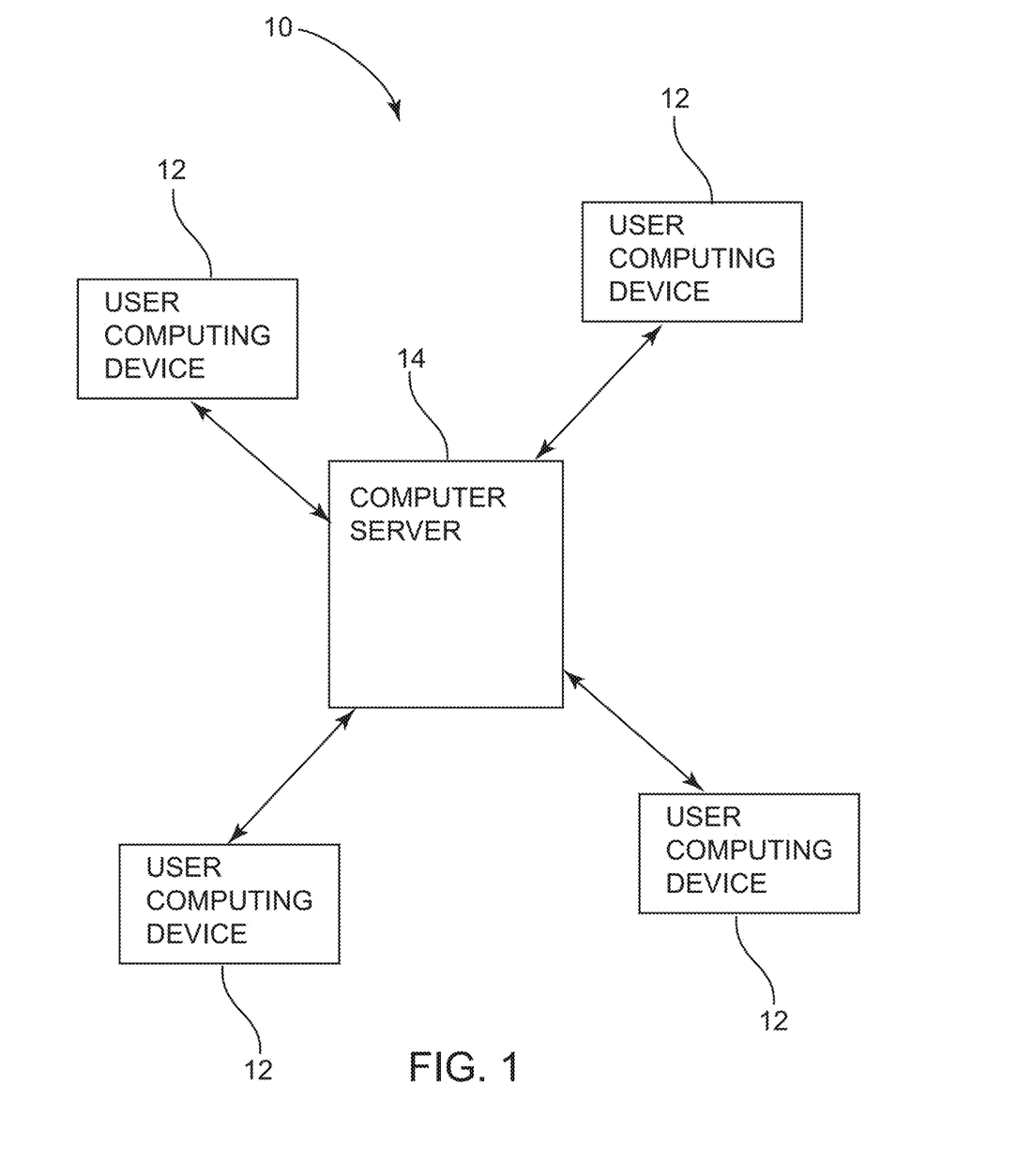
FIG. 1 is a diagrammatic view of a community reporting system in accordance with an embodiment.

Referring to the drawings, FIG. 1 depicts an embodiment of a community reporting system 10. The system 10 may include user computing devices 12 and a computer server 14, wherein the user computing device 12 are coupled to the computer server 14. This coupling may be a network connection, such as through an Internet connection, wherein the user computing devices 12 may communicate with and receive communication from the server 14. The user computing devices 12 may be mobile computing devices, such as, but not limited to, smartphones, tablets, wearable technology and the like. Some community systems 10 may be established to allow anonymous reporting and other community systems may be established to not allow anonymous reporting. In embodiments that allow anonymous reporting, the user computing devices 12 may have an option to report a community condition anonymously.

The computer server 14 may include a memory storing community condition information including a description of the community condition and may include photos and videos corresponding to a reported community condition. The user computing device 12 may be coupled to the computer server 14, and, referring to FIG. 2, the computer server 14 may be programmed to receive from the user computing device 12 a signal having community condition information, which may include a geotagged community condition in a corresponding community (Step 20); automatically accumulate the community condition information and aggregate the community condition information within the memory to store the accumulated and aggregated information corresponding to the community information in which the community condition occurred (Step 21), which may be done in response to processing the geotagged community condition information; and maintain the community condition information stored in the memory of the computer server 14 (Step 22).

Figure 2:
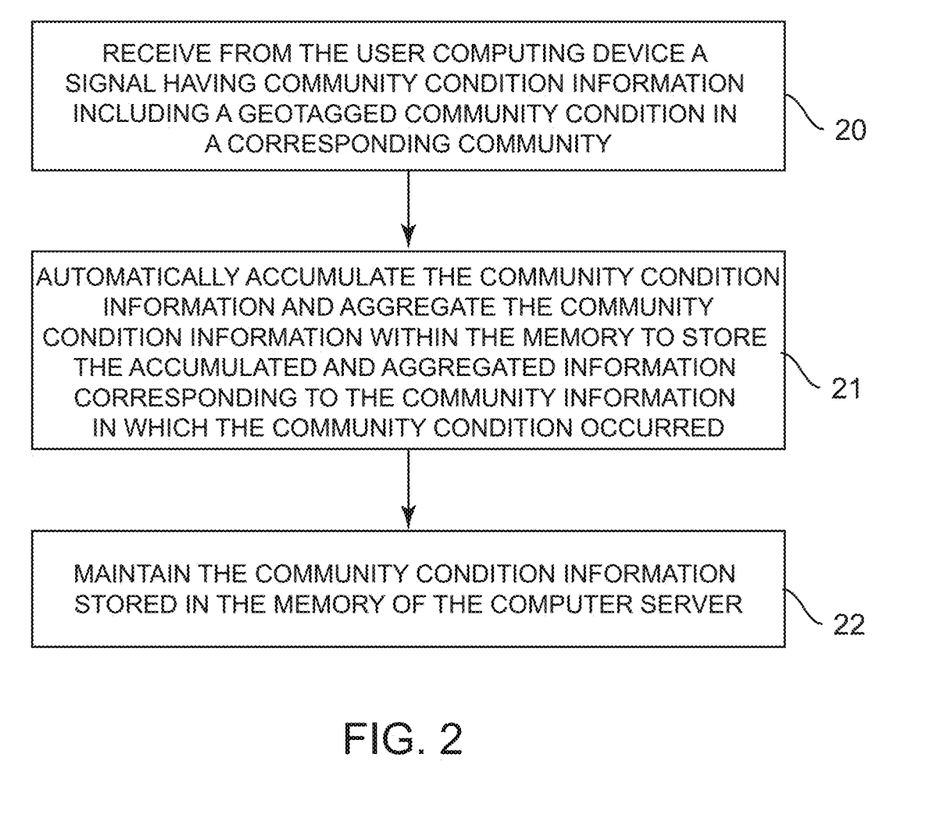
FIG. 2 is a flow chart of programmed steps of a computer server of a community reporting system in accordance with an embodiment.

In embodiments, the community condition information may be geotagged with information provided by the global positioning system device of the user computing device prior to receiving the community condition information by the computer server. In other embodiments, the community condition information may be geotagged manually by providing an address of the community condition. In some embodiment, photos and videos may be added to a reported community condition in order to help interpret and identify the reported community condition, which may be accomplished using a camera of the user computing devices 12.

Further, the computer server 14 may be further programmed to aggregate information based on the geotagged community condition information. This allows for a collection of community condition information and helps a community or neighborhood to identify if there are repeat offenders or trouble areas in the community or neighborhood that need to be addressed. It allows for further action to be taken by involving the community within the discovery of community conditions and further can include the community to address the concerns brought out in the reported community condition. Additionally, this aggregation of information may be sent to municipalities in order to effectively handle community conditions that need municipality involvement. It may also be sent to community organizations, home owners' associations, real estate agents and the like.

The computer server 14 may be further programmed to automatically generate a report of community conditions in response to receiving a signal requesting a report from a responsible party, wherein the report segregates the community conditions based on the geotagged community condition information. The responsible party may be an individual such as, but not limited to a councilman, a parent, a principal, an employer, a home owner's association chair and the like; or it may be an entity such as, but not limited to a local governing entity, a home owner's association, neighborhood patrol, contracted maintenance workers and the like. The responsible party may be any individual or entity that is responsible for or has authority for addressing the community condition and resolving any issues related thereto. For example, the report may be requested from a community association in order to identify whether notices under community agreements need to be made, whether certain additional assessments need to be made and the like. In some embodiments, the reporting may allow users to select certain report information, such as, but not limited to type of community conditions, location of community conditions, number and time of community conditions, and the like.

The reporting features of the system 10 may include real-time reporting to a responsible party where designated, wherein the real-time information is updated with reports submitted, particularly updating in real-time, previously reported community conditions with newly submitted reports on the same condition. This real-time reporting may be an alert sent to a device of the responsible party. Additionally, the system 10 may operate to notify or alert all users of the system 10 of reported community conditions. In some embodiments, the alert may be automatically sent to a user computing device 12 of a community condition of a corresponding community when the user computing device 12 has a location adjacent to, approaching and/or within the corresponding community, as determined by the global positioning system device.

Figure 3A:
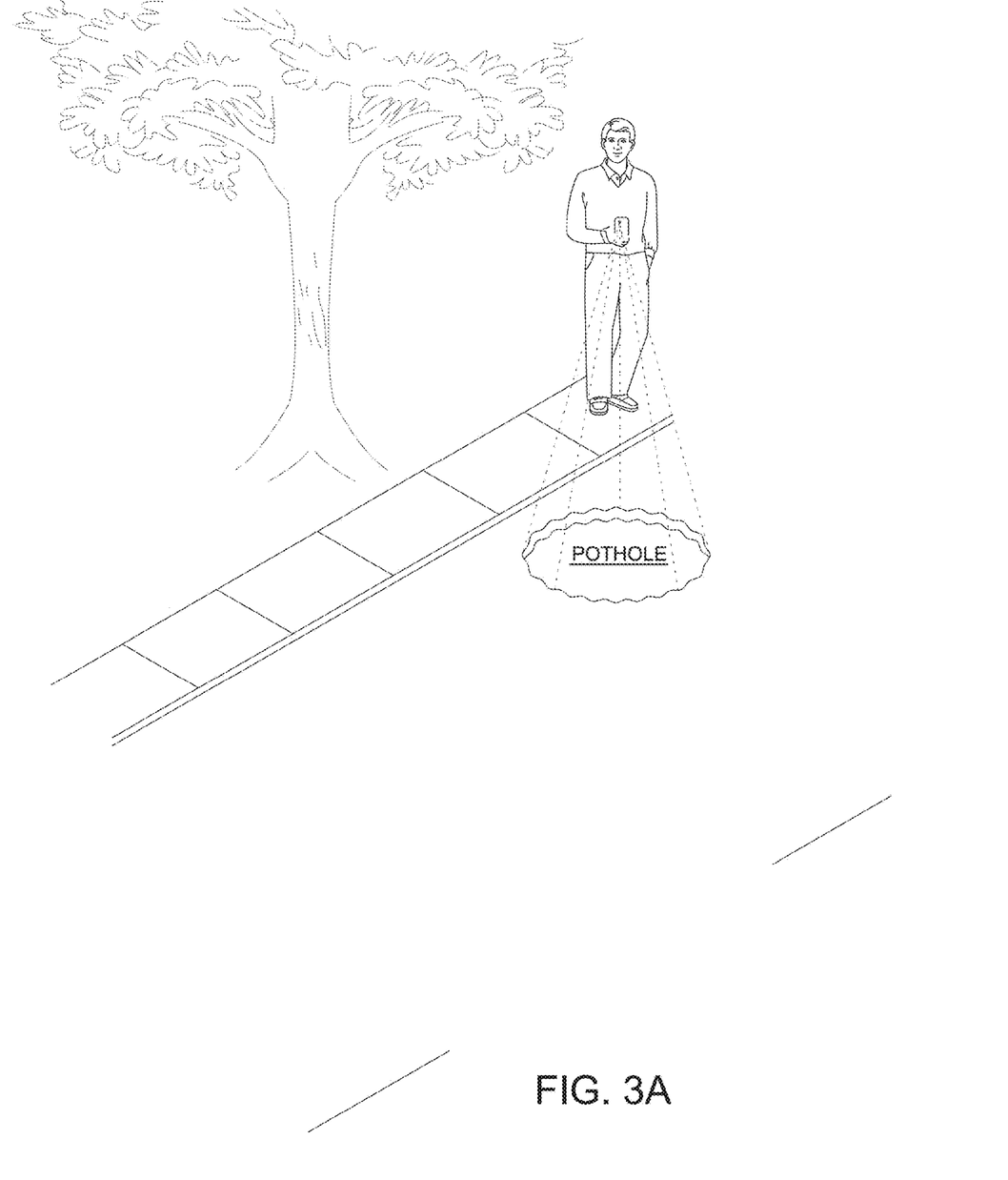
FIG. 3A is a perspective view of a community reporting system depicting reporting of a pothole in accordance with an embodiment.
Figure 3B:
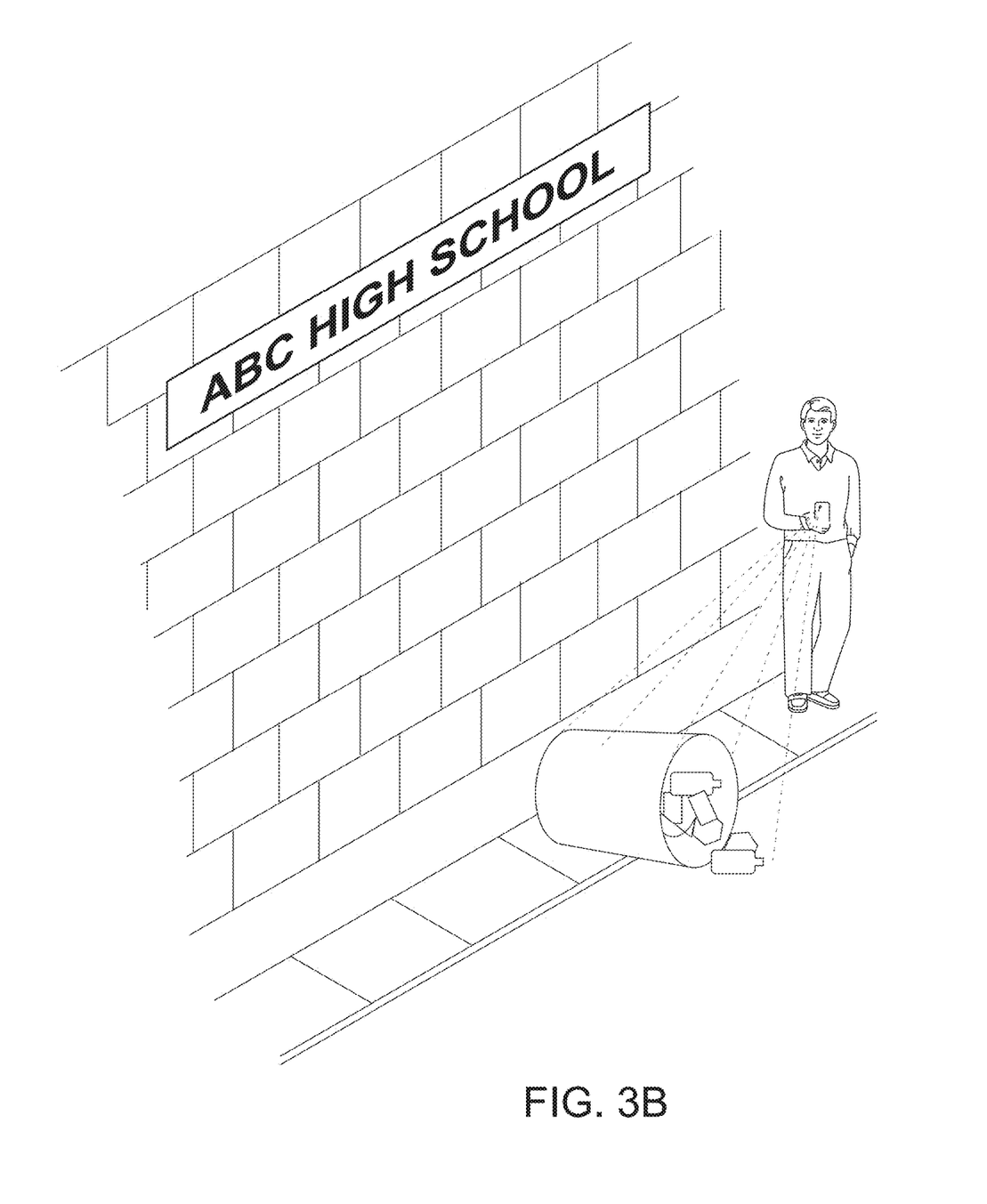
FIG. 3B is a perspective view of a community reporting system depicting reporting of an overturned trashcan in accordance with an embodiment.
Figure 3C:
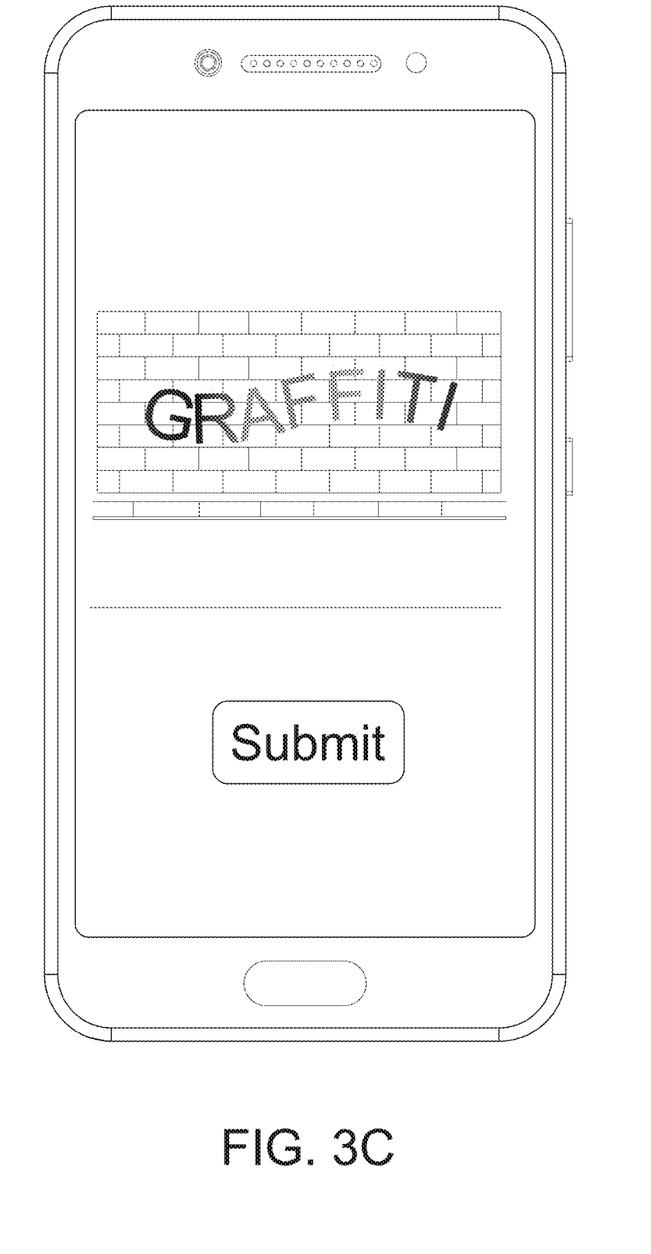
FIG. 3C is a perspective view of a community reporting system depicting reporting of graffiti applied to a wall in accordance with an embodiment.

In embodiments, the system 10 includes the server programmed to aggregate the information based on GPS location of the community conditions reported in order to establish a community circle or area, and thereby aggregate the reports within these community circles. For example, and without limitation, community circles may include, a neighborhood, a home owner's association, a town, a city, a school, a shopping center, a park, a sports venue, a store and the like. For example, FIG. 3A depicts the system 10 utilized in a community that is a neighborhood with a user reporting a pothole; FIG. 3B depicts the system 10 utilized in a community that is a school with a user reporting an overturned trashcan; and FIG. 3C depicts the system 10 utilized in a community that is a town, city, school, shopping center, park, sports venue, store or the like with a user computing device reporting graffiti.

The server 14 may be programmed to interpret the community conditions information to suggest action and timing of action for addressing the reported community condition. This may include identifying times when user report the community condition and identifying a likely time for addressing the community condition when most convenient to the community. The server 14 may also be programmed to prioritize what community condition should receive higher priority over other reported community conditions. The priority may be established based on frequency of the reports, the number of reports received, type of community condition and the like. It will be understood that embodiments of the system 10 are not intended to replace emergency reporting systems, such as, but not limited to 911.

The application operated on the computer server 14 provides a way to blow the whistle on community conditions that the local governing entity may not be aware of or ignoring, or general information about the well-being of the neighborhood or community. The application may also provide an easier way for citizens exercise their collective voice to alert the community and local authorities to interface with local governments or individuals throughout the neighborhood or community about problems and provide alerts on their mobile device via the application. Application as used herein may include a mobile application and/or website.

In some embodiments, the system 10 may automatically rank community conditions. The ranking may be determined in response to the number of reports of the same community condition, thereby increasing the ranking to indicate priority of community conditions reported. The ranking may be any type of ranking including number ranking, letter ranking, star ranking, and the like to designate which community conditions are more important to the community of users reporting community conditions.

Additionally, in some embodiments, the system 10 may include a point system, wherein each user is provided a predetermined number of points that can be used to report within a predetermined time period, such as, but not limited to, 100 points in a day, wherein each report of an community condition requires a certain number of points to report, thereby limiting how many reports a single user can make in the predetermined time period, and further avoid driving up a ranking of an community condition that is truly not being reported by different users. In other embodiments, the system 10 may include the computer server 14 further programmed to identify whether a user has already reported the community condition and not adjusting the ranking of the community condition. The system may also adjust the ranking of the community condition if the same user reports it again outside of a predetermined amount of time from the first reported community condition.

Geotagging may be used to add geographical identification, such as a geotagged photograph or video, to identify common problems and/or concerns and to develop useful databases for neighborhoods and communities. Geotagging relies on global positioning system (GPS) technology. The application can accumulate data and relate it to known information to generate reports and to provide intelligent interpretation of neighborhood and community information, i.e. an intelligent neighborhood patrol.

The application may empower citizens to draw attention to the "squeaky wheel" to get services and/or responses to community problems. The application utilizes photography to accumulate common information and aggregate it a specific area. The application may empower citizens to accumulate real-time, actionable data and not rely solely on often stale reports from public agencies. Public agencies may also benefit from this data to provide better services. This intelligent community patrol may integrate the data to determine trends and observations that may benefit community data collection and response.

The application allows citizens in a community to collaborate with one another to stand strong against the problems in their neighborhood or community. Through a shared feed for a specific neighborhood or community, citizens have the opportunity to upload photographs, videos and/or status updates about announcements, unusual occurrences or other information that is pertinent to that particular neighborhood or community. Certain announcements can also trigger alerts to community leaders or watch committees. This application is configured to harness the power of cell phones and other technology to influence action.

Embodiments may be available on or through the internet, such as through domain names reserved and owned by Applicant that include communityconcern.com, communityhazard.com, inthehoodreport.com, myhoodreport.com, neighborhoodhazard.com, watchyourstreet.com, zipcodehazard.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A community reporting system comprising:
 a computer server having a memory for storing community condition information and community information; and
 a user computing device coupled to the computer server, the user computing device configured to geotag community condition information, wherein the computer server is programmed to:
  receive from the user computing device a signal having geotagged community condition information including a community condition in a corresponding community;
  automatically accumulate the geotagged community condition information and aggregate the community condition information within the memory to store the accumulated and aggregated information corresponding to the community information in which the community condition occurred in response to processing the geotagged community condition information;
  maintain the community condition information stored in the memory of the computer server; and
  automatically generate a report of community conditions in response to receiving a signal requesting a report, wherein the report segregates the community conditions based on the geotagged community condition information.

2. The community reporting system of claim 1, wherein the user computing device includes a camera.

3. The community reporting system of claim 2, wherein photographs, videos or combination of photographs and videos taken with the user computing device are added to the community condition information stored by the computer server.

4. The community reporting system of claim 3, wherein the computer server is further programmed to aggregate information including the photographs, videos or combination of photographs and videos.

5. A community reporting system comprising:
 a computer server having a memory for storing community condition information and community information; and
 a plurality of user computing devices coupled to the computer server, each user computing device configured to geotag community condition information, wherein the computer server is programmed to:
  receive from more than one user computing device signals having community condition information including a community condition within a corresponding community;
  automatically accumulate the geotagged community condition information from the more than one user computing device and aggregate the community condition information within the memory to store the accumulated and aggregated information corresponding to the community information in which the community condition occurred in response to processing the geotagged community condition information;

maintain the community condition information stored in the memory of the computer server; and automatically generate a report of community conditions in response to receiving a signal requesting a report, wherein the report segregates the community conditions based on the geotagged community condition information.

6. The community reporting system of claim 5, wherein each of the plurality of user computing devices include a camera.

7. The community reporting system of claim 6, wherein photographs, videos or combination of photographs and videos taken with the user computing device are added to the community condition information stored by the computer server.

8. The community reporting system of claim 7, wherein the computer server is further programmed to aggregate information including the photographs, videos or combination of photographs and videos.

9. The community reporting system of claim 5, wherein the community condition information is geotagged with information provided by a global positioning system device of the more than one user computing device prior to receiving the community condition information by the computer server.

10. The community reporting system of claim 9, wherein the computer server is further programmed to aggregate information based on the geotagged community condition information.

11. A community reporting system comprising:
a computer server having a memory for storing community condition information and community information; and
a user computing device coupled to the computer server, the user computing device is configured to geotag community condition information, wherein the computer server is programmed to:

receive from the user computing device a signal having community condition information including a community condition in a corresponding, wherein the community condition information is geotagged;

automatically accumulate the community condition information and aggregate the community condition information within the memory to store the accumulated and aggregated information corresponding to the community information in which the community condition occurred in response to processing the geotagged community condition information;

maintain the community condition information stored in the memory of the computer server;

automatically send to an alert to another user computing device of the system of the community condition associated with the community condition information; and automatically generate a report of community conditions in response to receiving a signal requesting a report, wherein the report segregates the community conditions based on the geotagged community condition information.

12. The community reporting system of claim 11, wherein each of the plurality of user computing devices include a camera.

13. The community reporting system of claim 12, wherein photographs, videos or combination of photographs and videos taken with the user computing device are added to the community condition information stored by the computer server.

14. The community reporting system of claim 13, wherein the computer server is further programmed to aggregate information including the photographs, videos or combination of photographs and videos.

15. The community reporting system of claim 11, further comprising more than one user computing device sending information to the computer server.

* * * * *